United States Patent Office 2,970,066
Patented Jan. 31, 1961

2,970,066
PROCESS OF TREATING POLYMERIC STRUCTURES AND PRODUCT THEREOF

Donald Eugene Brasure, Tonawanda, N.Y., assignor to E. I. du Pont de Nemours and Company, Wilmington, Del., a corporation of Delaware No Drawing. Filed Aug. 31, 1959, Ser. No. 836,933

16 Claims. (Cl. 117—33.3)

This invention relates to the preparation of polymeric structures and more particularly, to polymeric structures suitable for outdoor use.

Polymeric structures, although used widely in outdoor applications, leave much to be desired in these applications. When used as self-supporting films in constructing greenhouses and the like, some polymers such as the polyesters, the polyamides, polyethylene, polyvinyl chloride, etc. become degraded upon prolonged exposure to sunlight. Degradation may take the form of discoloration, surface crazing, a decrease in elongation and flexibility ultimately resulting in embrittlement, etc. Other polymeric materials such as polyvinyl fluoride, polyvinylidene fluoride and polyacrylonitrile, polytetrafluoroethylene and copolymers of tetrafluoroethylene with hexafluoropropene, while not affected substantially by ultraviolet light themselves, transmit ultraviolet light to such an extent that they offer little protection to substrates when they are used as the outer layer of laminates and the like.

The use of ultraviolet light absorbing compounds either as coatings for the polymeric structures or as blending ingredients in preparing the polymeric structures is known. The shortcomings of the blending procedure are at once apparent. Distributing the relatively expensive ultraviolet light absorber throughout the structure is uneconomical. Such distribution also tends to dilute the effectiveness of the absorber. Coating procedures, although concentrating the absorber at the surface where it is most needed, are plagued by a general lack of adhesion between polymeric surface and coating composition.

It is an object of the present invention to overcome the pitfalls of the prior art and provide an improved weather-resistant organic polymeric shaped structure. A further object is to provide a polymeric structure, particularly an organic polymeric self-supporting film adherently coated with ultraviolet light absorbing compounds. Still another object is to provide an economical and efficient process for accomplishing the aforementioned objects. Other objects will appear hereinafter.

The objects are accomplished by coating an active-hydrogen containing surface of an organic polymeric structure with a composition containing at least one organic compound having a plurality of isocyanate groups and at least one benzoyl compound, the benzoyl compound having substituted therein at least one ortho-hydroxyl group and at least one additional active-hydrogen containing group besides the aforementioned hydroxyl group, and causing the structure, the isocyanate and the benzoyl compound to interreact, preferably by heating to a temperature of at least 50° C.

The organic polymeric structure may have an active-hydrogen containing surface inherently or the structure may be treated to contain such a surface as will be discussed subsequently.

By a benzoyl compound having at least one ortho-hydroxyl group substituted therein is meant a compound having the following radical therein:

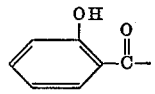

That is, the hydroxyl group is ortho to the carbonyl group. The other active-hydrogen atom, besides that of the ortho-hydroxyl group, may appear in a group attached through the linkage to the carbonyl group shown or in a second group, besides the ortho-hydroxyl group shown, substituted on the benzene ring.

It is believed that the extended life of the polymeric structure is attributable to the reaction that occurs between the isocyanate groups of the polyisocyanate and the active-hydrogen atoms of both the polymeric structure and the benzoyl compound. Thus, the resulting product of the present invention is an organic polymeric structure bonded through a divalent linkage to a divalent radical, which in turn is bonded through a divalent linkage to the ortho-hydroxyl benzoyl compound, the divalent radical being the nucleus of the polyisocyanate.

The nucleus of the polyisocyanate or, more accurately, the isocyanate group-containing compound is frequently hydrocarbon in composition. However, the nuclei are not restricted thereto. For example, adducts may be formed by the reaction of compounds containing a plurality of isocyanate groups with compounds containing a plurality of active hydrogen-containing groups (e.g. amino or hydroxyl groups), said adducts containing at least two unreacted isocyanate groups. By way of illustration; if two moles of hexamethylene diisocyanate react with one mole of paraphenylenediamine, the nucleus of the resulting diisocyanate will contain two ureylene, i.e.

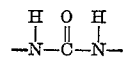

groups; if two moles of hexamethylene diisocyanate are permitted to react with one mole of ethylene glycol the nucleus of the resulting diisocyanate will contain two urethane, i.e.

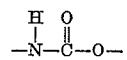

groups. Other variations will occur to one skilled in the art.

The resulting polymeric product formed by the reaction of the benzoyl compound and the polyisocyanate with the original polymeric structure may be depicted by the following formula:

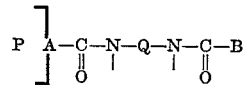

wherein

P is the original polymeric structure
B is the benzoyl compound
Q is the nucleus of isocyanate group-containing compound
A is selected from

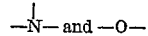

The product will be discussed in greater detail in a subsequent section of the specification.

The success of applicant's invention is surprising in view of the fact that the ortho-hydroxyl group of the benzoyl compound is a factor that contributes very substantially to the ultraviolet light absorbing qualities of the benzoyl compound. However, it is also known that hydroxyl groups, since they contain active hydrogen atoms, are highly reactive with isocyanate groups. Yet the final product of the present invention retains the ultraviolet light absorbing quality despite the use of isocyanate-containing compounds. This would indicate that the ortho-hydroxyl group of the benzoyl compound has not reacted with any isocyanate group. Even when the isocyanate groups are present in considerable stoichiometric excess over the number of active-hydrogen atoms in the ultraviolet light absorbing compound, and even in the presence of a catalyst such as a tertiary amine, the ultraviolet light absorbing property characteristic of the ortho-hydroxyl benzoyl nucleus is still retained.

In the following sections, the polymeric shaped structures, the ultraviolet light absorbing compounds, the organic isocyanates, the solvents for the coating compositions, the operating conditions for the process of the present invention and the product of the invention will be discussed in detail.

ORGANIC POLYMERIC SHAPED STRUCTURE

While the examples in the specification are directed primarily to films in the form of self-supporting films or as part of laminates, the process of the present invention may be used to treat other shaped structures such as filaments (Example 10), fibers, rods, tubes, etc.

The polymeric shaped structures suitable for use in the invention are those whose surfaces contain active-hydrogen atoms. Active-hydrogen atoms have been defined by Zerewitinoff in the following two articles: Berichte, 40, 2023 (1907), and Berichte, 41, 2233 (1908), and in an article by Kohler in J. Am. Chem. Soc., 49, 3181 (1927). In short, active hydrogen atoms are those contained in hydroxyl (—OH) and amino (—NH— or —NH$_2$) groups.

Thus, shaped structures of polyamides, polyesters, polyesteramides, cellulose acetate, cellulose acetate/butyrate, polyvinyl butyral and partially hydrolyzed polymers of vinyl acetate contain active-hydrogen atoms in the form of —OH and —NH— on their surface and, in fact, throughout their cross sections as well. Other polymeric structure such as those of polyvinyl fluoride, polyvinyl chloride, polyacrylonitrile, polyvinylidene fluoride, polyethylene and polypropylene, which do not contain active-hydrogen atoms according to Zerewitinoff, may be made to contain active-hydrogen atoms in the form of —OH and —NH— on their surfaces by special treatment. A treatment with hot dilute caustic solution will provide an active-hydrogen containing surface for polyacrylonitrile structures. Flame treatment, ozonization, chlorination or treatment with concentrated sulfuric acid alone or with chromic acid or dichromates will provide active-hydrogen containing surfaces for structures of polyethylene and polypropylene. Treatment with boron trifluoride, as described in application Serial No. 700,953, filed to R. O. Osborn and assigned to the assignee of the present application, will provide an active-hydrogen containing surface for all of the aforementioned polymeric structures.

ULTRAVIOLET LIGHT ABSORBING COMPOUNDS

For the purpose of the present invention, it is essential that the ultraviolet light absorbing compound contain at least one active-hydrogen atom in addition to that contained in a hydroxyl group located ortho to the carbonyl group. Thus, the ultraviolet light absorber, the ortho-hydroxy benzoyl compound, may be selected from the following:

(1)

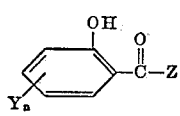

and (2)

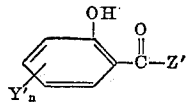

wherein
Z is selected from —NH$_2$, —NHR, —R″OH and

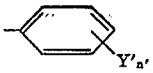

Y′ is selected from —OH, —NH$_2$, —NHR,

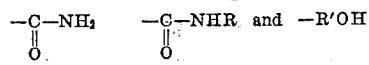

Y is selected from —Y′, —H, —NO$_2$,

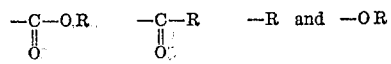

Z′ is selected from —Z, —R, —OR and

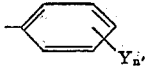

R is selected from phenyl radicals and alkyl radicals having 1–8 carbon atoms,
R′ is selected from phenylene radicals and alkylene radicals having 1–8 carbon atoms,
R″ is an alkylene radical having 1–8 carbon atoms,
n is an integer having a value of 1–4, and
n′ is an integer having a value of 1–5.

It should be understood that the above structural formulae represent minimum requirements for the ortho-hydroxy benzoyl compounds useful in the present invention. Other substitutions of the phenyl, phenylene, alkyl and alkylene radicals, other than those shown in the above definition, are permitted. The only limitation is that such other substituted groups will not derogate from or interfere with the effectiveness as an ultraviolet light absorber of the illustrated compound.

Among the ultraviolet light absorbing compounds that fall within the above formulae and may be successfully employed in the invention are the following ortho-hydroxy-substituted benzophenones:

2,4-dibenzoyl resorcinol;
2-hydroxy-5-salicyloyl benzophenone;
4,6-dibenzoyl resorcinol;
o-bis(salicyloyl)benzene;
2,2′-dihydroxybenzophenone;
2,4-dihydroxybenzophenone;
2,4′-dihydroxybenzophenone;
2,4,4′-trihydroxybenzophenone;
2,2′,4-trihydroxybenzophenone;
2,2′,4,4′-tetrahydroxybenzophenone;
2,2′-dihydroxy-4,4′-dimethoxybenzophenone;
2,2′-dihydroxy-4-methoxybenzophenone;
2,2′,4-trihydroxy-4′-n-butoxybenzophenone;
5-t-butyl-2,4-dihydroxybenzophenone;
5-t-butyl-2,2′,4-trihydroxybenzophenone;
5-t-amyl-2,4-dihydroxybenzophenone;
5-t-butyl-2,2′-dihydroxy-4-methoxybenzophenone;
5-t-butyl-2,2′-dihydroxy-4-dodecyloxybenzophenone;
5,5′-di-t-butyl-2,2′,4,4′-tetrahydroxybenzophenone;
3,5,5′-tri-t-butyl-2,2′,4,4′-tetrahydroxybenzophenone;
3,5,5′-tri-t-amyl-2,2′,4,4′-tetrahydroxybenzophenone and
2,2′-dihydroxy-4-methoxy-4′-ethoxybenzophenone;
salicylamide and its N-substituted derivatives;
2,4-dihydroxyacetophenone, o-hydroxy-alpha-hydroxyacetophenone and their alkyl homologs;
methyl beta-resorcylate, methyl gamma-resorcylate and their aryl and alkyl homologs.

ORGANIC ISOCYANATES

Among the organic compounds containing a plurality of —NCO groups which may be employed in this invention are aliphatic diisocyanates such as hexamethylene diisocyanate, decamethylene diisocyanate, ethylene diisocyanate, trimethylene diisocyanate, tetramethylene diisocyanate, pentamethylene diisocyanate, proplyene-1,2-diisocyanate; aromatic diisocyanates, such as m-phenylene diisocyanate, p-phenylene diisocyanate, 2,4-toluene diisocyanate, 2,6-toulene diisocyanate, diphenyl-4,4′- diisocyanate, methylene bis(4-phenyl isocyanate), m-xylene diisocyanate; triisocyanates such as butane-1,2,2-triisocyanate, 2,4,6-toluene triisocyanate, etc.

A particularly useful type of organic compound containing a plurality of —NCO groups includes the adducts formed by reacting (1) 5 moles of hexamethylene diisocyanate with 2 moles of trimethylolpropane;
(2) 5 moles of 2,4-toluene diisocyanate or 2,6-toluene diisocyanate or a mixture of these isomers with 2 moles of trimethylolpropane;
(3) 3 moles of 2,4-toluene diisocyanate with 1 mole of trimethylolpropane.

Similar useful adducts formed by the reaction of diisocyanates and triols and triamines will occur to those skilled in the art. In preparing the adduct, it should be remembered that for the puropse of the present invention, the resulting adduct must have at least two isocyanate groups.

ORGANIC SOLVENT FOR COATING COMPOSITION

The selection of the organic solvent poses a slight problem. It is desirable but not necessary that a single solvent suitable for both the ultraviolet light absorber and the polyisocyanate compound be used. However, since the ultraviolet light absorber is permitted to have a wide variety of substituent groups, although having a common nucleus, the selection of such a solvent may offer a slight challenge, but one that is easily overcome by those skilled in the art.

The organic solvents suitable for use in the present invention may be selected by testing the following: ketones such as acetone, methyl ethyl ketone and methyl isobutyl ketone; esters such as ethyl acetate and butyl acetate; aromatic hydrocarbons such as benzene, toluene and the xylenes; chlorinated aromatic compounds such as orthodichlorobenzene; and chlorinated aliphatic compounds such as carbon tetrachloride, 1,1,2-trichloroethane and symtetrachloroethane.

OPERATING CONDITIONS

The process of the present invention involves coating the shaped structure with a coating solution and then causing the ingredients of the coating solution to react while driving off the solvent. Coating may be accomplished by any convenient method. Thus, the shaped structure may be passed through a bath of the coating composition in a continuous or batch manner. The coatings may also be sprayed or brushed on the structure. As far as obtaining reaction between the ingredients of a coating composition and the shaped structure and also driving off the solvent, the coated material may be exposed to a temperature in the vicinity of or above the organic solvent's boiling point. However, it should be understood that temperatures below the boiling point can also be used where time is not important. In ordinary practice, it is preferred to expose the coated structure to temperatures ranging from 50° C. to about 200° C., the upper limit being subject to the thermal behavior of the polymer involved.

It will be obvious to one skilled in the art that a wide range of comparative reactivities will exist between isocyanate groups and the particular reactive active-hydrogen-containing group on the ultraviolet light absorbers. Thus, for a given ultraviolet light absorbing compound and a given isocyanate-containing compound such as 2,2',4,4'-tetrahydroxybenzophenone and hexamethylene diisocyanate, it may be permissible to mix them in a solution and allow the solution to stand at room temperature for sometime before applying the solution as a coating. On the other hand, for another pair of reactants such as 2-hydroxy-4-amino benzophenone and p-phenylene diisocyanate, it may be necessary to mix them quickly into solution at room temperature and then apply the coating solution almost immediately. The difference in reactivity may even require that a catalyst such as a tertiary amine be employed to insure that chemical bonding with the polymer structure occurs rapidly.

An alternate method of carrying out the coating step of the process is to immerse the polymeric structure in an organic solvent solution of the isocyanate-containing organic compound and then to immerse the isocyanate-treated structure in a solution of the ultraviolet light absorber. Optionally, the structure may be heated immediately upon removal from the isocyanate-containing solution to reduce the amount of solvent to be volatilized after subsequent immersion in the ultraviolet light absorber solution. Where convenient, either or both of the solutions may be held at reflux temperatures during immersion. Again, it may be advantageous to include a small amount of catalyst such as a tertiary amine in the ultraviolet light absorber solution to accelerate reaction or the catalyst may be applied after immersion in the ultraviolet light absorber solution.

It should be pointed out that the reaction should be carried out under substantially anhydrous conditions. Water, by reacting with isocyanate groups, would tend to reduce the isocyanate groups available for reaction with the essential ingredients of the reaction mixture.

The advantages of the present process are numerous. It has been found that the ultraviolet light absorbent coatings cannot be dissolved from the polymeric surfaces either by the action of organic liquids or water. Nor can these coatings be sublimed from the surfaces by heating nor stripped by the action of pressure-sensitive adhesive tape. A particular advantage of the process lies in the financial saving obtained by using a firmly attached coating of the ultraviolet light absorber. Since a concentration of the ultraviolet light absorber to any substantial depth in the structure is not required, a minimum of the relatively expensive ultraviolet light absorber can be used successfully.

Incidentally, there is an unplanned advantage accruing from the use of the isocyanate-containing component of the coating composition in stoichiometric excess over that required for reaction with the benzoyl compound and the polymeric structure. The presence of unreacted isocyanate groups on the surface of the polymeric structure tends to promote the adherence of the coated surface to other materials. It appears that many adhesive systems which are commonly used such as the polyester types, partially hydrolyzed vinyl chloride/vinyl acetate copolymers, etc. are cured effectively by the reaction of their active-hydrogen-containing groups with the isocyanate groups. Thus, certain desirable laminates using the coated materials produced by the present invention can be formed very effectively.

FINAL PRODUCT

The final product of the invention is simply the polymeric structure bonded at a plurality of points on its surface to the ortho-hydroxyl benzoyl compound through the isocyanate group-containing compound. As shown previously the product may be depicted as:

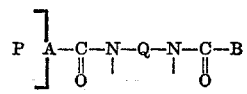

P being polyamide, polyester, polyesteramide, cellulosic polymer, polyvinyl butyral, partially hydrolyzed vinyl ester (vinyl acetate and the like) polymers, or treated hydrocarbon (ethylene, propylene), acrylonitrile and halogenated hydrocarbon (vinyl and vinylidene halide) polymers (treated to contain active-hydrogen atoms on their surfaces).

Q being alkylene, arylene or a group containing alkylene or arylene radicals.

B being selected from the following:

(1)
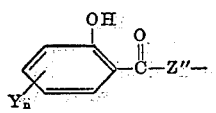

and (2)
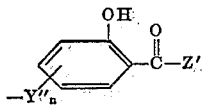

wherein
Z″ is selected from —NH—, —NR—, —R″O— and

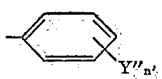

Y‴ is selected from —O—, —NH—, —NR—

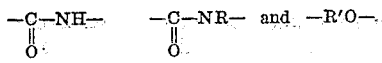

Y is selected from —OH, —NH$_2$, —NHR,

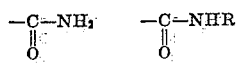

and

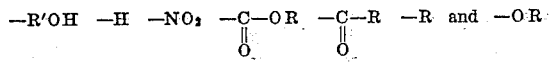

Z′ is selected from —Z, —R, —OR and

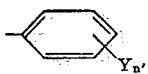

R is selected from phenyl radicals and alkyl radicals having 1–8 carbon atoms,
R′ is selected from phenylene radicals and alkylene radicals having 1–8 carbon atoms,
R″ is an alkylene radical having 1–8 carbon atoms,
n is an integer having a value of 1–4, and
n′ is an integer having a value of 1–5.
Z is selected from —NH$_2$, —NHR, —R″OH and

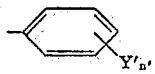

Y′ is selected from —OH, —NH$_2$, —NHR

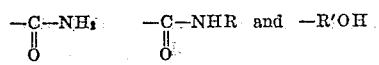

A being —O— or

When A is —O— (provide by P from —OH groups on the surface) the linkage between Q and P may be

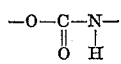

urethane; or

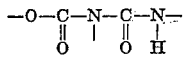

allophanate or the like.
When A is

the linkage between Q and P may be

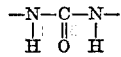

ureylene; or

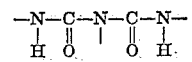

allophanamido or the like.

It should be understood that P can provide —O— from

groups. The linkage between Q and P would then be carbonyl urethane, carbonyl allophanate, etc. Similarly P can provide

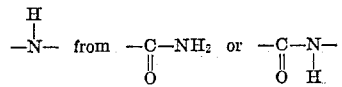

groups. The linkage between Q and P would then be carbonyl ureylene, carbonyl allophanamido, etc.

The invention will be more clearly understood by referring to the examples which follow. It should be understood, however, that the examples are merely illustrative and should not be construed to limit the invention in any way.

*Example 1*

A 1 mil thick polyvinyl fluoride film was prepared according to the following procedure.

A 35% solids mixture of particulate polyvinyl fluoride and gamma-butyrolactone was prepared and fed into a heated extruder connected to a 14 inch wide slotted steel casting hopper maintained at approximately 160° C., from which it was continuously extruded as a tough, coalesced gel film into a water quench bath maintained at about 10° C. On removal from the quench bath, the 13 mil thick film, now containing approximately 63% gamma-butyrolactone by weight, based on the total weight of polymer plus solvent, was stretched continuously, first in the machine or longitudinal direction, and then in the transverse direction.

The film was stretched longitudinally 2.0× between two horizontally mounted pairs of contra-rotating nip rolls in parallel arrangement and maintained at approximately 80° C. The film exciting from the longitudinal stretcher contained about 59% gamma-butyrolactone by weight, based on the total weight of polymer solvent, and was fed continuously into an enclosed tenter frame and directed between two parallel rows of tenter clips mounted on endless chains. The clips grasped the edges of the film and were caused to move apart by diverging guide rails. The film was thus stretched transversely 2.6× while the ambient air temperature in the enclosure was maintained at about 120° C. At this point, the guide rails again became parallel and the film, now containing approximately 10% gamma-butyrolactone by weight, based on the total weight of polymer plus solvent, entered the drying zone of the apparatus where it was restrained from shrinking while the remaining gamma-butyrolactone was volatilized by air maintained at about 190° C.

The resulting polyvinyl fluoride film was then passed through a stainless steel lined treating chamber containing a gaseous mixture consisting of about 50% boron trifluoride and about 50% air, maintained at about 72° C., for a period of about 4 seconds.

Samples of the film were then cut and coated on one surface with a solution composed of the following ingredients:

| | |
|---|---|
| 2,2′,4,4′-tetrahydroxybenzophenone _____grams__ | 1 |
| 60% solution in methyl isobutyl ketone of the reaction product of 4 moles 2,4-toluene diisocyanate and 1 mole 2,6-toluene diisocyanate with 2 moles trimethylolpropane _____grams__ | 1 |
| Methyl ethyl ketone _____milliliters__ | 50 |

After 10 minutes of drying in a circulating air oven maintained at a temperature of 100° C., the coated samples were laminated to pieces of 5-ply birch exterior plywood using the following adhesive system:

| | Parts |
|---|---|
| 15% solution in 1,1,2-trichloroethane of polyester of ethylene glycol and dimethyl terephthalate/dimethyl sebacate | 10 |
| 60% solution in methyl isobutyl ketone of reaction product of 4 moles 2,4-toluene diisocyanate and 1 mole 2,6-toluene diisocyanate with 2 moles trimethylolpropane | 0.25 |

The adhesive was first applied to the exterior surface of the plywood. After driving off solvent, the coated plywood was heated for 5 minutes at a temperature of 100° C. The laminate was then formed by pressing together the coated surfaces of both the polyvinyl fluoride film and the plywood. Lamination was completed by heating the combination in a platen press under a pressure of 300 p.s.i. for 5 minutes at a temperature of 100° C.

As one control, Control A, an uncoated polyvinyl fluoride film, treated as before with boron trifluoride, was laminated to the plywood in a manner similar to that described above using the same adhesive system.

As a second control, Control B, an uncoated polyvinyl fluoride film as in Control A was laminated to the plywood in the manner similar to that described above, using an adhesive system containing in addition to the foregoing ingredients 0.075 part of 2,2',4,4'-tetrahydroxybenzophenone.

The resulting three sets of samples were subjected to two weathering tests: one, an accelerated weathering test and the other a 6-month outdoor exposure. The accelerated weathering test comprised a 500-hour exposure in a Type HVDL-X Atlas Weather-Ometer.[1] While in the test device, the samples underwent the following continuous schedule: 1 hour of water spray in darkness, 2 hours of light, 2 hours of water spray in darkness and 6 hours of light. While exposed to the light, the samples were slowly rotated about the light source to insure uniform exposure.

The 6-month exposure was carried out in Hialeah, Florida. The laminates were mounted on racks facing due south and slanted 45°.

The effects observed on the plywood substrates follow:

| | Accelerated Test | 6-Month Exposure |
|---|---|---|
| Example 1 | No Change | No Change. |
| Control A | Considerably Darker | Quite Yellow. |
| Control B | No Change | Yellow. |

From the above results, it is evident that in the test involving prolonged exposure, the bonding of the ultraviolet light absorber (2,2',4,4'-tetrahydroxybenzophenone) to the polyvinyl fluoride film achieved by the present invention is critical to success.

*Example 2*

Polyvinyl fluoride film samples prepared as in Example 1 were coated on one surface with a solution composed of the following ingredients:

| | |
|---|---|
| 2,4-dihydroxybenzophenone grams | 1 |
| 60% solution in methyl isobutyl ketone of the reaction product of 4 moles 2,4-toluene diisocyanate and 1 mole 2,6-toluene diisocyanate with 2 moles trimethylolpropane grams | 1 |
| Methyl ethyl ketone milliliters | 50 |

The subsequent procedure of forming the laminate with plywood and testing was identical to that described in Example 1.

[1] A test device using twin carbon arcs manufactured by Atlas Electrical Devices Company, Chicago, Illinois.

Control A was the same as Control A in Example 1.

Control B contained 0.075 part of 2,4-dihydroxybenzophenone instead of the 2,2',4,4'-tetrahydroxybenzophenone used in Control B of Example 1. The effects observed on the plywood substrates follow:

| | Accelerated Test | 6-Month Exposure |
|---|---|---|
| Example 2 | No Change | No Change. |
| Control A | Considerably Darker | Quite Yellow. |
| Control B | No Change | Yellow. |

*Example 3*

Although polyvinyl fluoride film is usually considered to be virtually unaffected by ultraviolet light, there is some adverse effect over an extended period of time as shown in its reduced elongation after prolonged exposure to ultraviolet light. In this example, the effect of ultraviolet light is determined for a polyvinyl fluoride film treated to contain active-hydrogen atoms in its surface and coated in accordance with the present invention.

Polyvinyl fluoride film samples, prepared and treated with boron trifluoride, as in Example 1, were coated on one surface to a thickness of about 0.02 mil with the coating composition given in Example 1, i.e., the coating composition containing 2,2',4,4'-tetrahydroxybenzophenone and the reaction product or adduct of the toluene diisocyanates and trimethylolpropane.

As one control, Control A, polyvinyl fluoride film samples prepared and treated with boron trifluoride as in Example 1 were coated on one surface with a composition containing 1 gram of 2,2',4,4'-tetrahydroxybenzophenone in 50 milliliters of methyl ethyl ketone but only 0.1 gram of the solution of the aforementioned adduct of toluene diisocyanates and trimethylolpropane. However, Control A was not subjected to further testing since the coating was easily removed by gentle brushing with a soft cloth.

As a second control, Control B, samples of the uncoated polyvinyl fluoride film, treated as before with boron trifluoride, were used.

The two sets of samples were exposed to ultraviolet light in an accelerated weathering device for 500 hours. The device consisted of ten 20" long, 20 watt fluorescent sunlamps spaced parallel to and equidistant from each other around the circumference of an 8" diameter circle. A slotted cylindrical rack having an inside diameter of 15.5" was mounted on a table and disposed concentrically around the cylinder formed by the sunlamps. The film samples to be tested were fastened to the inside of the slotted rack, their coated surfaces toward the sunlamps. The rack was rotated continuously during the test. Temperature was maintained at about 60° C., and the relative humidity between 20% and 30%. Air containing a gaseous oxidizing agent was circulated through the enclosure during the 500-hour test.

The ultraviolet light absorption of the sample prepared according to the present invention remained constant during this test. The following results were obtained upon measuring elongation in the conventional manner and comparing the final elongation to that of the starting film:

| | Loss in elongation |
|---|---|
| Example 3 | 50%. |
| Control A | Coating came off with gentle brushing with soft cloth. |
| Control B | 80%. |

*Example 4*

Example 3 was repeated using a coating solution containing 2,4-dihydroxybenzophenone instead of the 2,2',4,4'-tetrahydroxybenzophenone of Example 3. In Control A, the polyvinyl fluoride film samples were coated on one surface with a composition consisting of 1 gram of 2,4-dihydroxybenzophenone in 50 milliliters of methyl ethyl ketone with 0.1 gram of the solution of the aforementioned reaction product of the toluene diisocyanates and trimethylolpropane. However, Control A was not tested further for the same reason as its counterpart in Example 3. Control B was the same as Control B in Example 3.

The two sets of samples were exposed to ultraviolet light in the accelerated weathering device described in Example 3 for 500 hours. The following results were obtained:

Loss in elongation
Example 4_____ 40%.
Control A_____ Coating came off with gentle brushing with soft cloth.
Control B_____ 80%.

*Example 5*

Film samples were cut from a commercial polyethylene film known to have hydroxyl groups present on the surface of the film indicated as "printable" by the manufacturer. A coating composition containing the following ingredients was applied to the active hydrogen-containing surface of these film samples.

2,2',4,4'-tetrahydroxybenzophenone _____grams__ 1
60% solution in methyl isobutyl ketone of the reaction product of 4 moles 2,4-toluene diisocyanate and 1 mole 2,6-toluene diisocyanate with 2 moles trimethylolpropane _____grams__ 1
Methyl ethyl ketone _____milliliters__ 50

As one control, Control A, a sample of the polyethylene film was coated on its active hydrogen-containing surface with 1 gram of 2,2',4,4'-tetrahydroxybenzophenone dissolved in 50 milliliters of methyl ethyl ketone, no isocyanate being used. However, Control A was not subjected to further testing since the coating was easily removed by gentle brushing with a soft cloth. A sample of the polyethylene film, as received, was employed as Control B.

The coated samples were dried in a circulating air oven at a temperature of 80° C. for 10 minutes. After drying, the samples were tested for ultraviolet light resistance as follows: four 20" long, 20 watt fluorescent sunlamps were mounted parallel to one another on 2½" centers 1" below a chromium plated reflector sheet. The lamps were enclosed in a box opened at the bottom so that the undersurfaces of the tubes were 3" from the flat surface upon which the box rested. Aluminum channels 3" wide and ½" deep were placed on the flat and the test samples, ½" wide, were placed across the channel and taped down securely with their coated surfaces facing the light source. The inner surfaces of the sample holders were painted with a flat black to avoid light reflection. The sample holders were shifted about daily so as to compensate for any variation in light intensity along the length of the tubes. The flexibility of the test and control film strips was checked by removing them momentarily from the tester and subjecting them to 180° folding and twisting action by hand. Failure was indicated when the film broke or tore.

The following results were obtained:

Time before failure
Example 5_____ 550-700 hours.
Control A_____ Coating came off with gentle brushing with soft cloth.
Control B_____ 350 hours.

*Example 6*

The commercial polyethylene film described in Example 5 was coated on its active hydrogen-containing surface and tested as in Example 5 but with a coating composition containing the following ingredients:

2,4-dihydroxybenzophenone _____grams__ 1
60% solution in methyl isobutyl ketone of the reaction product of 4 moles 2,4-toluene diisocyanate and 1 mole 2,6-toluene diisocyanate with 2 moles trimethylolpropane _____grams__ 1
Methyl ethyl ketone _____milliliters__ 50

As one control, Control A, a sample of the polyethylene film was coated with the identical composition as above except that the quantity of the adduct solution, that containing the reaction product of the toluene diisocyanates with trimethylolpropane, was only 0.1 gram. However, Control A was not tested further for the same reason as its counterpart in Example 5. Control B was the same as Control B in Example 5.

After drying and testing as in Example 5, the following results were obtained:

Time before failure
Example 6_____ 550-700 hours.
Control A_____ Coating came off with gentle brushing with soft cloth.
Control B_____ 350 hours.

*Examples 7-9*

Separate polyvinyl fluoride film samples, prepared and treated with boron trifluoride as in Example 1, were coated on one surface with solutions composed of the following ingredients:

Example 7:
  2,2,4,4'-tetrahydroxybenzophenone ____grams__ 1
  60% solution in methyl isobutyl ketone of the adduct formed by the reaction of 4 moles of 2,4-toluene diisocyanate and 1 mole of 2,6-toluene diisocyanate with 2 moles of trimethylolpropane _____grams__ 1
  Methyl ethyl ketone _____ml__ 50

Example 8:
  5,5'-di-tert-butyl-2,2',4,4' - tetrahydroxybenzophenone _____grams__ 1
  Adduct solution described in Example 7__do____ 1
  Methyl ethyl ketone _____ml__ 50

Example 9:
  2,2',4,4'-tetrahydroxybenzophenone ____grams__ 1
  Hexamethylene diisocyanate_____do____ 1
  Methyl ethyl ketone _____ml__ 50

The coated film samples were allowed to air dry for 10 minutes and were then placed in a forced air circulation oven maintained at 100° C. for 15 minutes.

Film samples of Examples 7, 8 and 9 were subjected to different types of accelerated exposures in an effort to determine the permanency of the above-described coatings. As a control, a polyvinyl fluoride film containing homogeneously distributed therein approximately 0.6% by weight, based on the weight of polyvinyl fluoride, of 2,2'-dihydroxy-4,4'-dimethoxybenzophenone was also subjected to the previously described boron trifluoride treatment.

The following exposures were employed.

A. A dark, circulating air oven maintained at 60° C.
B. The accelerated weathering test employed in Example 3.
C. The accelerated weathering test employed in Example 3, but without the addition of the gaseous oxidizing agent to the circulating air.

These exposures will hereinafter be identified by the letters A, B and C.

Initially and at intervals during the above-described exposures, both infrared and ultraviolet spectra of the above-described test films were examined. A reduction in the height of the absorption peak selected as characterizing the particular ultraviolet light absorbing compound, compared to that established by the initial reading, and referred to a common base line (indicating zero absorption) was interpreted as indicating a loss from the film sample of a proportionate amount of the light absorber originally present on or in said film sample.

A Perkin-Elmer Model 21, double-beam, infrared recording spectrophotometer and a Beckman DK-2 ultraviolet recording spectrophotometer were employed in this work. In evaluating infrared spectra, the absorption peaks at 6.20, 6.17 and 6.19 microns were examined for 2,2′,4,4′ - tetrahydroxybenzophenone, 5,5′-di-tert-butyl-2,2′,4,4′-tetrahydroxybenzophenone and 2,2′-dihydroxy-4,4′-dimethoxybenzophenone, respectively. Similarly, in examining ultraviolet spectra, absorption peaks at appropriately characteristic wave lengths were selected.

The rates of loss of ultraviolet light absorber from the above-described test films are tabulated below. These data show a distinct advantage in the use of the process of this invention over the technique of incorporating the ultraviolet light absorber into the polymeric film.

RATE OF LOSS[1] OF ULTRAVIOLET LIGHT ABSORBER PERCENT PER HOUR

| Example | Exposure A | Exposure B | Exposure C |
|---|---|---|---|
| 7 | 0.01 | 0.04 | 0.03 |
| 8 | 0.01 | 0.07 | 0.12 |
| 9 | 0.01 | 0.06 | 0.10 |
| Control | 0.06 | 0.67 | 0.20 |

[1] Average of infrared and ultraviolet determinations.

Example 10

A length of 34 filament, 70 denier nylon (polyhexamethylene adipamide) yarn containing 0.3% titanium dioxide by weight, based on the weight of polymer, was immersed for 15 seconds in a room temperature solution consisting of 2.5 grams of methylene bis (4-phenyl isocyanate) dissolved in 50 milliliters of dry toluene. The yarn was allowed to drain and then briefly dried in air. The yarn was then immersed for 30 seconds in a refluxing solution consisting of 1 gram of 5-tert-butyl-2,2′,4-trihydroxybenzophenone dissolved in 50 milliliters of dry toluene containing several drops of triethylamine. On removal from the latter solution, the yarn was dried in an air stream at approximately 120° C. for 3 minutes.

The coated yarn was wound on a black cardboard test panel with individual strands being separated from one another for uniformity of exposure and convenience in removal. A control test panel was wound with the same yarn as received before coating. These panels were exposed to an accelerated weathering in a Type DMT-VC Atlas Weather-Ometer.[2] In this test device the panels were continually exposed to light from the single arc, but the water spray normally employed was omitted. At intervals of about 50 hours, the panels were removed and tensile tests performed on the yarn. The half-life of the control yarn sample was about 400 hours while that of the coated yarn sample was about 650 hours. The half-life is the exposure time in which the tenacity of the yarn falls to one half the original value.

Examples 11-15

Polymeric films containing active-hydrogen atoms on their surface, either inherently or by well-known treatment, were subjected to compositions composed of equal amounts of an isocyanate group-containing compound and an ortho-hydroxy benzoyl compound in methyl ethyl ketone in the manner described in Example 5. The resulting films were tested for ultraviolet light resistance as in Example 5 and similar improvements were noted. The polymeric films, the isocyanate compounds and the benzoyl compounds used are summarized in Table I.

[2] A test device using a single carbon arc manufactured by Atlas Electrical Devices Company, Chicago, Illinois.

TABLE I

| Ex. | Film | Isocyanate Compound | Benzoyl Compound |
|---|---|---|---|
| 11 | Polyvinyl chloride [1] | 2,4-toluene diisocyanate. | 2,4-dibenzoyl resorcinol. |
| 12 | Polyacrylonitrile [1] | decamethylene diisocyanate. | 2 - hydroxy - 5 - salicyloyl benzophenone. |
| 13 | Cellulose acetate | p-phenylene diisocyanate. | 2,2′ - dihydroxy - 4 - methoxybenzophenone. |
| 14 | Polypropylene [1] | butane - 1,2,2 - triisocyanate. | 2,4 - dihydroxy - acetophenone. |
| 15 | Polyethylene terephthalate. | diphenyl - 4,4′ - diisocyanate. | methyl beta-resorcylate. |

[1] Surface treated to contain active-hydrogen atoms.

It is apparent from the foregoing examples that organic polymeric shaped structures of improved weatherability can be made by the process of the present invention. However, it is also apparent that the ratio of the number of gram equivalents of isocyanate groups in the organic compound or compounds having a plurality (at least two) of isocyanate groups used to the number of gram equivalents of active-hydrogen atoms in excess of the active-hydrogen of the requisite orthohydroxyl group in the benzoyl compound used is important in the present invention. Thus, the ratio of gram equivalents of isocyanate groups-to-gram equivalents of excess active-hydrogen atoms should be at least 1:20. Particularly useful embodiments of the present invention are found when this ratio is from about 1:10 to about 10:1 (1:0.1). In the following table, Table II, are summarized the ratios of the gram equivalents of isocyanate groups in the isocyanate-containing organic compound to the gram equivalents of active-hydrogen atoms in excess of that in the orthohydroxyl group of the benzoyl compound for the examples and controls presented previously.

TABLE II

| Example | Ratio of gram equivalents of isocyanate groups-to-gram equivalents of excess active-hydrogen atoms. |
|---|---|
| 1 | 1:9.85 |
| 2 | 1:3.77 |
| 3 | 1:9.85 |
| Control A in 3 | 1:98.5 |
| 4 | 1:3.77 |
| Control A in 4 | 1:37.7 |
| 5 | 1:9.85 |
| 6 | 1:3.77 |
| Control A in 6 | 1:37.7 |
| 7 | 1:9.85 |
| 8 | 1:6.75 |
| 9 | 1:1.03 |
| 10 | 2.86:1 |
| 11 | 3.66:1 |
| 12 | 2.84:1 |
| 13 | 3.05:1 |
| 14 | 3.29:1 |
| 15 | 1.42:1 |

Having fully disclosed the invention, what is claimed is:

1. A process which comprises coating the surface of an organic polymeric structure having an active-hydrogen-containing surface with a composition containing at least one organic compound having a plurality of isocyanate groups and at least one benzoyl compound, said benzoyl compound having substituted therein at least one ortho-hydroxyl group and at least one additional active-hydrogen-containing group besides said hydroxyl group, the ratio of the number of gram equivalents of isocyanate groups in said organic compound to the number of gram equivalents of active-hydrogen atoms in said additional active-hydrogen-containing groups of said benzoyl compound being at least 1:20; and causing said structure, said isocyanate compound and said benzoyl compound to interreact.

2. A process as in claim 1 wherein said benzoyl compound is selected from the group consisting of (1)

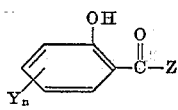

and (2)

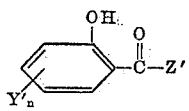

wherein Z is selected from the group consisting of —NH$_2$, —NHR, —R″OH and

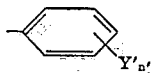

Y′ is selected from the group consisting of —OH, —NH$_2$, —NHR,

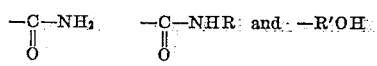

Y is selected from the group consisting of —Y′, —H, —NO$_2$,

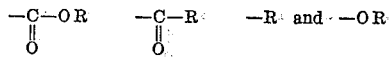

Z′ is selected from the group consisting of —Z, —R, —OR and

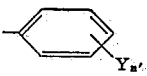

R is selected from the group consisting of phenyl radicals and alkyl radicals having 1–8 carbon atoms,
R′ is selected from the group consisting of phenylene radicals and alkylene radicals having 1–8 carbon atoms,
R″ is an alkylene radical having 1–8 carbon atoms,
$n$ is an integer having a value of 1–4, and
$n'$ is an integer having a value of 1–5.

3. A process as in claim 1 wherein said benzoyl compound is 2,4-dihydroxybenzophenone.

4. A process as in claim 1 wherein said benzoyl compound is 2,2′,4,4′-tetrahydroxybenzophenone.

5. A process as in claim 1 wherein said benzoyl compound is 5,5′-di-tert-butyl-2,2′,4,4′-tetrahydroxybenzophenone.

6. A process as in claim 1 wherein said benzoyl compound is 5-tert-butyl-2,2′,4-trihydroxybenzophenone.

7. A process as in claim 1 wherein said organic compound having a plurality of isocyanate groups is the reaction product of 4 moles of 2,4-toluene diisocyanate and 1 mole of 2,6-toluene diisocyanate with 2 moles of trimethylolpropane.

8. A process as in claim 1 wherein said organic compound having a plurality of isocyanate groups is hexamethylene diisocyanate.

9. A process as in claim 1 wherein said organic compound having a plurality of isocyanate groups is methylene-bis-(4-phenyl isocyanate).

10. A process as in claim 1 wherein said organic compound having a plurality of isocyanate groups is 2,4-toluene diisocyanate.

11. A process as in claim 1 wherein said organic polymeric structure is a polyvinyl fluoride structure having active-hydrogen atoms on the surface.

12. A process as in claim 1 wherein said organic polymeric structure is a polyethylene structure having active-hydrogen atoms on the surface.

13. A process as in claim 1 wherein said organic polymeric structure is a polyhexamethylene adipamide structure.

14. A process as in claim 1 wherein said ratio is from about 1:10 to about 10:1.

15. A process as in claim 1 wherein interreaction is caused by heating to a temperature of at least 50° C.

16. A polymer having the basic structural formula:

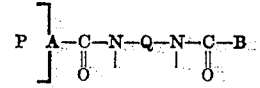

wherein P is selected from the group consisting of polyamide, polyester, polyesteramide, cellulosic polymer, polyvinyl butyral, partially hydrolyzed vinyl ester polymers, hydrocarbon polymers having active-hydrogen atoms on the surface, acrylonitrile polymers having active-hydrogen atoms on the surface and halogenated hydrocarbon polmers having active-hydrogen atoms on the surface;

Q is selected from the group consisting of alkylene, arylene, group containing at least one alkylene radical and group containing at least one arylene radical;

B is selected from the group consisting of

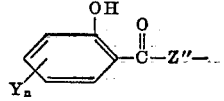

and

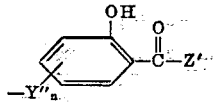

wherein Z″ is selected from the group consisting of —NH—, —NR—, —R″O— and

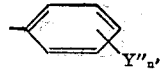

Y″ is selected from the group consisting of —O—, —NH—, —NR—,

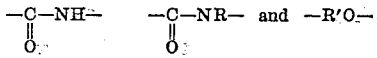

Y is selected from the group consisting of —OH, —NH$_2$, —NHR,

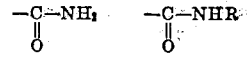

and —R′OH, —H, —NO$_2$

—R and —OH,

Z′ is selected from the group consisting of —Z, —R, —OR and

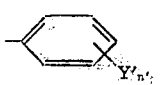

R is selected from the group consisting of phenyl radicals and alkyl radicals having 1–8 carbon atoms,
R′ is selected from the group consisting of phenylene radicals and alkylene radicals having 1–8 carbon atoms,
Z is selected from the group consisting of —NH$_2$, —NHR, —R″OH and Y' is selected from the group consisting of —OH, —NH₂, —NHR,
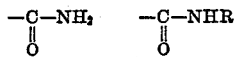
and —R'OH
R" is selected from the group consisting of an alkylene radical having 1–8 carbon atoms,
$n$ is an integer having a value of 1–4, and
$n'$ is an integer having a value of 1–5,
A is selected from the group consisting of —O— and
No references cited.